(12) United States Patent
Spencer et al.

(10) Patent No.: US 9,108,658 B2
(45) Date of Patent: Aug. 18, 2015

(54) STROLLER LOCKING MECHANISM

(71) Applicants: Halley N. Spencer, Finksburg, MD (US); Eric C Spencer, Finksburg, MD (US)

(72) Inventors: Halley N. Spencer, Finksburg, MD (US); Eric C Spencer, Finksburg, MD (US)

(*) Notice: Subject to any disclaimer, the term of this patent is extended or adjusted under 35 U.S.C. 154(b) by 0 days.

(21) Appl. No.: 14/606,116

(22) Filed: Jan. 27, 2015

(65) Prior Publication Data

US 2015/0137467 A1 May 21, 2015

(51) Int. Cl.
*B62B 1/00* (2006.01)
*B62B 9/08* (2006.01)
*B62B 9/20* (2006.01)

(52) U.S. Cl.
CPC .. *B62B 9/085* (2013.01); *B62B 9/20* (2013.01)

(58) Field of Classification Search
USPC ...................................................... 280/47.38
See application file for complete search history.

(56) References Cited

U.S. PATENT DOCUMENTS

| 5,713,585 | A | 2/1998 | Curtis et al. | |
|---|---|---|---|---|
| 5,730,255 | A | 3/1998 | Helmers | |
| 6,022,042 | A | 2/2000 | Hartenstine | |
| 6,148,942 | A | 11/2000 | Mackert | |
| 6,298,949 | B1 | 10/2001 | Yang | |
| 6,817,451 | B1 | 11/2004 | Chen | |
| 7,144,025 | B2 | 12/2006 | Wakita et al. | |
| 7,448,476 | B2 | 11/2008 | Otterson | |
| 7,735,843 | B2 | 6/2010 | Dotsey et al. | |
| 7,784,801 | B2 | 8/2010 | Yeh | |
| 8,333,393 | B2 | 12/2012 | Geeslin | |
| 8,789,662 | B2 | 7/2014 | Childs | |
| 2005/0236217 | A1* | 10/2005 | Koelin et al. | 180/411 |
| 2014/0196991 | A1 | 7/2014 | Fite | |
| 2014/0348986 | A1* | 11/2014 | Beyer et al. | 426/231 |

FOREIGN PATENT DOCUMENTS

WO WO2009062347 A1 5/2009

* cited by examiner

*Primary Examiner* — John Walters
*Assistant Examiner* — James Triggs

(57) ABSTRACT

A locking device for baby strollers is described which is automatically engaged and disengaged based simply on the presence or absence of a human hand on the stroller handle. If there is no hand on the stroller, the lock is automatically engaged, and if a hand is present on the handle, the lock is automatically disengaged.

10 Claims, 2 Drawing Sheets

STROLLER LOCKING MECHANISM

BACKGROUND OF THE INVENTION

This invention relates generally to baby strollers and the like and more particularly to stroller locking devices that prevent a baby stroller from rolling along the surface.

SUMMARY OF THE INVENTION

It is well known within the art relating to baby strollers that it is desirous to be able to engage and disengage a locking device that prevents the baby stroller from rolling away in an uncontrolled fashion. Almost exclusively, these locking mechanisms require them to be manually engaged and disengaged by the user. This has resulted in numerous cases of runaway baby strollers when the user forgets to engage the locking device and the stroller and the baby roll away. Typical locking devices will engage with either one or both rear wheels of the stroller and prevent the stroller wheel from rolling. However, to date, these locking devices require that they be manually engaged by the user, typically by pressing on a locking lever with a foot to engage and disengage the locking device. More recently, some strollers also include a hand activated locking mechanism that requires a grip located on the stroller handle to be squeezed in order to release the locking device.

There therefore is a need for a locking mechanism that will automatically engage whenever a user's hand is not touching the handle of the stroller and automatically disengages when a user touches the handle of the stroller. The mechanism must be powered through the use of an on board replaceable or rechargeable battery. The mechanism preferably should be robust enough to ensure it safely prevents the stroller from rolling away uncontrollably and quickly engages and disengages in response to the touch of the human hand to the handle of the stroller.

OBJECTS OF THE INVENTION

In addition, other objects of the invention are to provide a highly reliable, easy to use automatic locking device for baby strollers that prevents injury to babies as a result of a runaway stroller due to the user forgetting to lock the stroller.

DETAILED DESCRIPTION

Figure 1:
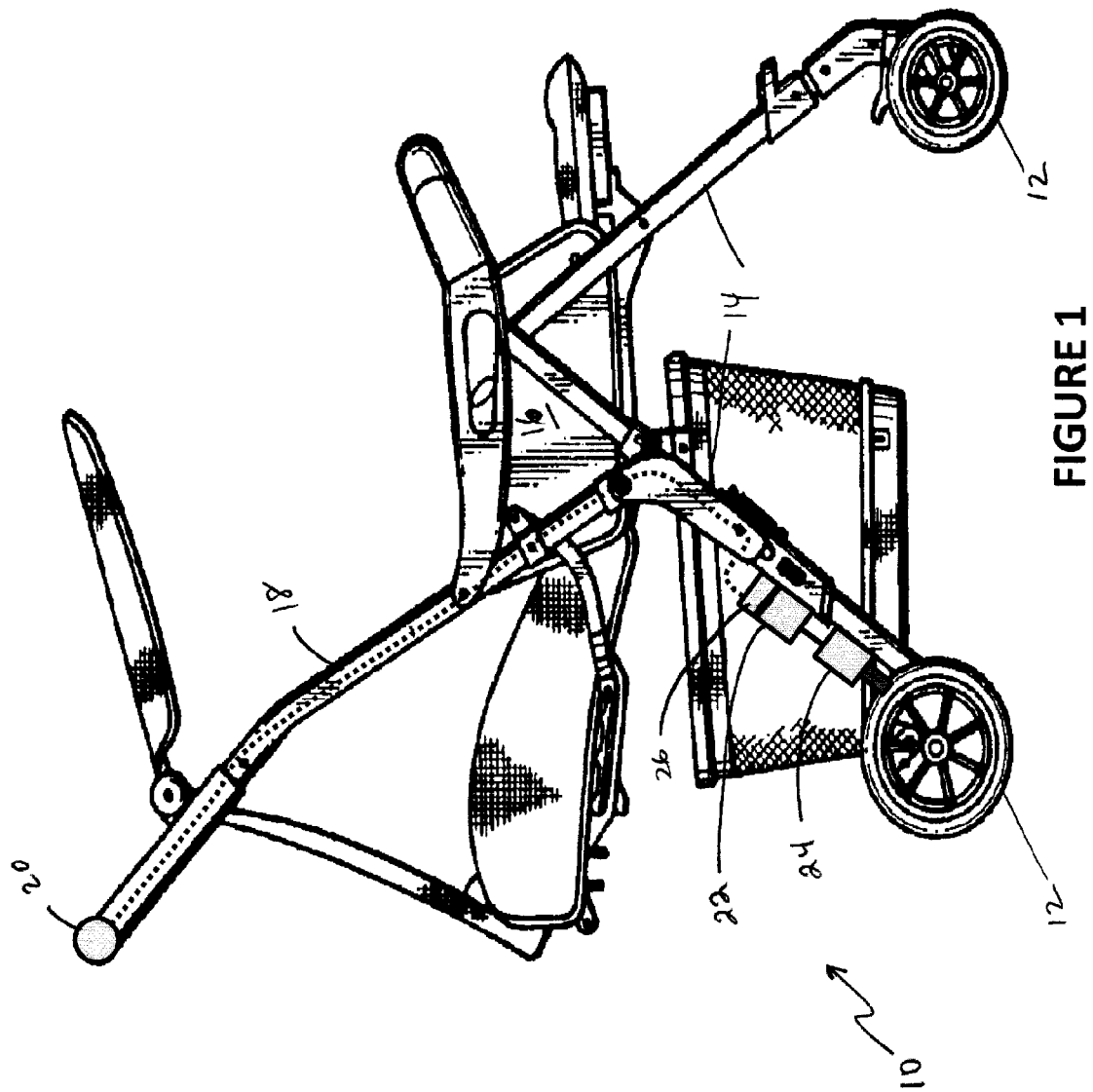
FIG. 1 is a side view in accordance with an embodiment of the invention.

Referring first to FIG. 1, which depicts a baby stroller 10 in accordance with an embodiment of the invention. As well known in the art, the baby stroller 10 is comprised of four wheels 12 (note that some strollers have only three wheels) that roll along the surface, a frame structure 14 is configured to hold a seating area 16. The seating area 16 is configured to safely receive and retain a baby of various sizes. Typically a handle frame 18 is provided that extends upwardly so that a user may control the stroller 10 from a rear position as the stroller 10 is pushed from behind.

In a preferred embodiment, disposed on the handle frame 18 may be a touch plate 20 that is in communication with an electrical circuit 22 that is configured to sense the presence or absence of a human hand. The touch plate 20 may be disposed below the surface or integral to the surface of the handle frame 18. In the preferred embodiment, the touch plate 20 may be an electrically conductive material that is embedded below the surface of the elongated handle frame 18.

As mentioned above, the touch sensor 20 is connected to an electronic circuit 22 that is configured to control an actuator 24. The actuator 24 may be a solenoid or a servo or other type of mechanical actuator that is configured to be selectably positioned between and extend or retracted position in response to a signal from the electronic circuit 22. A battery 26 powers the locking system, and preferably the battery 26 is easily replaceable and/or rechargeable.

Figure 2:
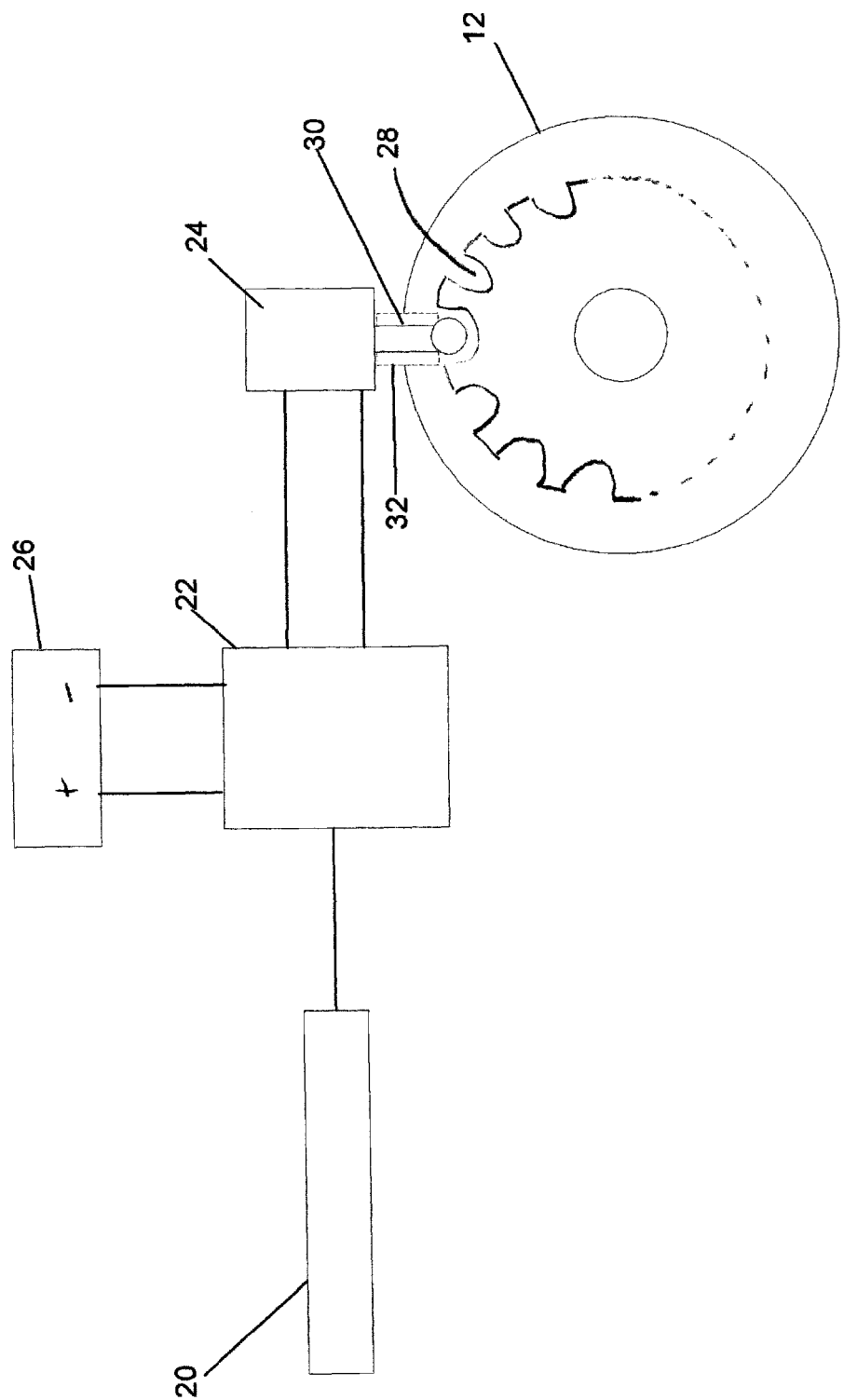
FIG. 2 is a schematic view of the stroller locking device in accordance with an embodiment of the invention.

Referring now to FIG. 2, which depicts a simplified schematic of the electronic circuit 22 and devices associated with an embodiment of the invention, the operation of the invention will now be described in more detail.

As mentioned previously, the touch plate 20 is in communication with the electronic circuit 22 such that the actuator 24 extends to a locking position when a user is no longer touching the handle 18 or the actuator 24 will retract to an unlocked position when a user touches the handle 18. The exact configuration of the actuator 24 and the associated mechanical interface to the wheel 12 may take on many variations, all such variations are fully contemplated by this disclosure. The stroller 10 will be in a locked and safe configuration when no one is holding the handle 18, and will be in an unlocked position when the user's hand is on the stroller's handle.

In the preferred embodiment, the circuit 22 and the actuator 24 should be configured to use very little electrical power so that the battery will last a long time, for example a year or two. This can be accomplished by only using battery power during the extension and retraction of the actuator 24. Therefore it may be preferable to have the actuator 24 mechanically held in the extended or retracted position without drawing any current from the battery 26. The actuator 24 may be electrically extended or retracted by altering the polarity of the voltage applied to the actuator 24.

In a preferred embodiment, and without limiting the variations possible, the actuator 24 extends a shaft 30 to a locked position such that it engages with a single pocket 28 that is formed in one of the wheels 12 of the stroller 10. A plurality of evenly spaced pockets 28 may be provided circumferentially along the wheel 12 such that the shaft 30 will engage a pocket no matter the orientation of the wheel 12. A spring 32 may be provided along the shaft 30 so that the shaft 30 is forced into a pocket 28 and held there under the spring's force. The spring 32 will help to ensure the shaft 30 is fully seated in a pocket 28 which will prevent the wheel 12 from rotating.

When the user touches the handle 18, the touch plate 20 in combination with the electronic circuit 22 will communicate with the actuator 24 and retract the shaft 30 to an unlocked position which will allow the wheel 12 to rotate freely. The shaft 30 may be held in an unlocked position by a mechanical detent (not shown) and therefore requires no electrical power to stay in the unlocked position.

Although an exemplary embodiment of the invention has been shown and described, many changes, modifications, and substitutions may be made by one having ordinary skill in the art without necessarily departing from the spirit and scope of this invention. For example, in the embodiment described, a single shaft is employed to engage with a pocket located on wheel of the stroller. The exact configuration of this locking mechanism could be easily modified and adapted to provide the same functionality. All such variations and modifications are fully contemplated by this invention.

What is claimed:

1. A locking device for a baby stroller comprising a touch sensing circuit in communication with an actuator wherein said actuator is configured to place the stroller in a locked condition when no hand is touching a handle of the stroller and wherein said actuator is configured to place the stroller in an unlocked condition when a hand is touching a handle of the stroller, wherein said actuator further comprises a spring, wherein said spring is biased to maintain the actuator in a locked position.

2. The locking device of claim 1, wherein said touch sensing circuit is further comprised of a touch plate disposed on the handle of the baby stroller.

3. The locking device of claim 1, wherein said actuator is one selected from a group consisting of a solenoid and a servo.

4. The locking device of claim 1, wherein said touch sensing circuit further comprises a touch plate disposed on the handle of the baby stroller, said touch plate being in electrical communication with the touch sensing circuit.

5. The locking device of claim 1, wherein said actuator is configured to engage and resist the rotation of a wheel disposed on the stroller.

6. A baby stroller configured to hold and transport a baby, comprising:
   a frame configured to support the baby in a seat portion of the stroller;
   a plurality of wheels affixed to said frame configured to allow the stroller to be rolled;
   a locking device disposed on the stroller comprising a touch sensing circuit in communication with an actuator wherein said actuator is configured to place the stroller in a locked condition when no hand is touching a handle of the stroller and wherein said actuator is configured to place the stroller in an unlocked condition when a hand is touching a handle of the stroller, wherein said actuator further comprises a spring, wherein said spring is biased to maintain the actuator in an extended and locked position.

7. The locking device of claim 6, wherein said touch sensing circuit is further comprised of a touch plate disposed on the handle of the baby stroller.

8. The locking device of claim 6, wherein said actuator is one selected from a group consisting of a solenoid and a servo.

9. The locking device of claim 6, wherein said touch sensing circuit further comprises a touch plate disposed on the handle of the baby stroller, said touch plate being in electrical communication with the touch sensing circuit.

10. The locking device of claim 6, wherein said actuator is configured to engage and resist the rotation of a wheel disposed on the stroller.

* * * * *